United States Patent
Wei

(10) Patent No.: US 10,770,992 B2
(45) Date of Patent: Sep. 8, 2020

(54) STABILIZER AUTO-ROTATING CONTROL METHOD

(71) Applicant: Guilin Feiyu Technology Corporation Ltd., Guilin, Guangxi (CN)

(72) Inventor: Chengyun Wei, Guangxi (CN)

(73) Assignee: Guilin Feiyu Technology Corporation Ltd., Guilin (CN)

( * ) Notice: Subject to any disclaimer, the term of this patent is extended or adjusted under 35 U.S.C. 154(b) by 218 days.

(21) Appl. No.: 16/008,087

(22) Filed: Jun. 14, 2018

(65) Prior Publication Data

US 2019/0214925 A1 Jul. 11, 2019

(30) Foreign Application Priority Data

Jan. 5, 2018 (CN) .......................... 2018 1 0013107
May 21, 2018 (CN) .......................... 2018 1 0490642

(51) Int. Cl.

| F16M 13/04 | (2006.01) |
| H02P 5/56 | (2016.01) |
| H02P 21/00 | (2016.01) |
| H02P 5/74 | (2006.01) |
| G03B 17/56 | (2006.01) |

(52) U.S. Cl.
CPC .................. *H02P 5/56* (2016.02); *H02P 5/74* (2013.01); *H02P 21/0025* (2013.01); *H02P 21/50* (2016.02); *G03B 17/561* (2013.01); *G03B 2205/0007* (2013.01)

(58) Field of Classification Search
CPC ......... G03B 17/00; G03B 17/56; F16M 13/04
USPC .............................. 396/421, 55; 348/208.99
See application file for complete search history.

(56) References Cited

U.S. PATENT DOCUMENTS

| 2015/0261070 A1* | 9/2015 | Feng .................... G03B 17/561 396/421 |
| 2017/0364077 A1* | 12/2017 | Sun ........................ B64C 39/024 |
| 2018/0003340 A1* | 1/2018 | Tian ..................... F16M 13/022 |

* cited by examiner

*Primary Examiner* — Clayton E. LaBalle
*Assistant Examiner* — Fang-Chi Chang

(57) ABSTRACT

The present invention provides a stabilizer and a stabilizer auto-rotating control method, wherein the stabilizer comprises: a hand-held component; a first motor, a second motor and a third motor provided on top of the hand-held component and separated from each other by preset angles in space; a bracket connected with the first motor and configured to fix a target object; a stator of the third motor being connected to the hand-held component; a rotor of the third motor being connected to a stator of the second motor; a rotor of the second motor being connected to a stator of the first motor; a rotor of the first motor being connected to the bracket.

9 Claims, 4 Drawing Sheets a calibration step 101: recording initial positions and end positions of the first motor 3, the second motor 4, and the third motor 5 in response to a calibration instruction for the stabilizer

a photographing step 102: controlling the first motor 3, the second motor 4, and the third motor 5 to rotate from the initial positions to the end positions at preset rotation speeds according to the initial positions and the end positions of the first motor 3, the second motor 4, and the third motor 5 in response to a photographing instruction

Fig.4

STABILIZER AUTO-ROTATING CONTROL METHOD

CROSS REFERENCE TO RELATED APPLICATIONS

The present application claims the benefit of Chinese Patent Application No. 201810013107.8 filed on Jan. 5, 2018 and Chinese Patent Application No. 201810490642.2 filed on May 21, 2018. All the above are hereby incorporated by reference.

FIELD OF THE INVENTION

The present invention relates to control field, more particularly to a stabilizer auto-rotating control method.

BACKGROUND OF THE INVENTION

Nowadays, more and more photography enthusiasts like shooting with time-lapse photography, but they lack a device that supports time-lapse photography. Most of photographers are shooting manually. Manual shooting has the disadvantages of uneven rotation speed, and poorly photographed works; and time-lapse photography takes such a long time that photographers would feel hand fatigued. The stabilizer is used to fix the target object, adjust the attitude of the target object (for example, with regards to directional motion, rolling motion and pitching motion) and stabilize the target object in a determined posture, so as to achieve stable, smooth, and multi-angle shooting of the target object. So far, the target objects are mobile phones, video cameras and cameras.

With regard to practical applications, it brings some trouble for realizing time-lapse photographing by means of manual shooting when a mobile phone is taken as a target object on a stabilizer.

In summary, the target object set on the stabilizer in the prior art cannot rotate automatically during shooting process; thereby time-lapse photography with uniform velocity cannot be realized.

SUMMARY OF THE INVENTION

The present disclosure provides a stabilizer auto-rotating control method, in order to solve the problem that stabilizer in the prior art cannot rotate automatically and realize time-lapse photography with uniform velocity.

The present disclosure provides a stabilizer auto-rotating control method, wherein the method is applicable for a stabilizer comprising:
a hand-held component;
a first motor, a second motor and a third motor provided on top of the hand-held component and separated from each other by preset angles in space;
a bracket connected with the first motor and configured to fix a target object;
a stator of the third motor being connected to the hand-held component; a rotor of the third motor being connected to a stator of the second motor; a rotor of the second motor being connected to a stator of the first motor; a rotor of the first motor being connected to the bracket;
the bracket rotating with an axis of the first motor when the first motor is started; the first motor and the bracket as a whole rotating with an axis of the second motor when the second motor is started; the first motor, the second motor and the bracket as a whole rotating with an axis of the third motor when the third motor is started;
wherein the method comprises:
a calibration step: recording initial positions and end positions of the first motor, the second motor, and the third motor in response to a calibration instruction for the stabilizer; and
a photographing step: controlling the first motor, the second motor, and the third motor to rotate from the initial positions to the end positions at preset rotation speeds according to the initial positions and the end positions of the first motor, the second motor, and the third motor in response to a photographing instruction.

Preferably, the stabilizer further comprises a key;
in the calibration step, the calibration instruction is generated in the following way:
the calibration instruction is generated when n times of successive pressing operations on the key are detected within a preset period of time; wherein n≥1.

Preferably, recording the initial positions and the end positions of the first motor, the second motor, and the third motor in the calibration step is consisted of:
recording current positions of the first motor, the second motor, and the third motor as the initial positions respectively when a first time of pressing operation on the key is detected; and recording current positions of the first motor, the second motor, and the third motor as the end positions respectively when a second time of pressing operation on the key is detected.

Preferably, the stabilizer further comprises a communication component; the stabilizer communicates with an external device through the communication component;
wherein the stabilizer auto-rotating control method further comprises:
receiving the preset rotation speeds of the first motor, the second motor and the third motor respectively from the external device by the communication device before receiving the photographing instruction.

Preferably, all of the first motor, the second motor and the third motor are three-phase brushless AC motors.

Preferably, rotations of the first motor, the second motor and the third motor are controlled through a vector control method.

Preferably, controlling the rotations of the first motor, the second motor and the third motor through the vector control method comprises: acquiring three-phase symmetrical AC vectors of the first motor, the second motor and the third motor in real time, and converting the three-phase symmetrical AC vectors into two-phase AC vectors separated by 90 degrees through Clark transforming;
converting the two-phase AC vectors separated by 90 degrees into an excitation current and a torque current by Park transforming; and
implementing feedback control on the three-phase symmetrical AC vectors of the first motor, the second motor and the third motor by adjusting the excitation current and the torque current.

Preferably, any two of axes of the first motor, the second motor and the third motor are separated by 90 degrees.

Preferably, the rotor of the third motor and the stator of the second motor are fixedly connected by a first extending arm, and the rotor of the second motor and the stator of the first motor are fixedly connected by a second extending arm.

Preferably, the first motor is provided with a first magnetic encoder for detecting and recording positions of the first motor, and the second motor is provided with a second magnetic encoder for detecting and recording positions of the second motor; the third motor is provided with a third magnetic encoder for detecting and recording positions of the third motor.

Preferably, the stabilizer further comprises a key control circuit and a motor control circuit; a signal output end of the key control circuit is connected with a signal input end of the motor control circuit, and a signal output end of the motor control circuit is connected with the first motor, the second motor and the third motor;

the key control circuit comprises a key; the key control circuit generates a control command in response to a user's pressing operation on the key, the key control circuit then sends the control command to the motor control circuit;

wherein the calibration step is consisted of:

generating a calibration command and sending the calibration command to the motor control circuit by the key control circuit, when n times of successive pressing operations on the key are detected within a preset period of time;

controlling the stabilizer to enter a calibration mode by the motor control circuit when receiving the calibration instruction;

generating a first saving instruction and sending the first saving instruction to the motor control circuit by the key control circuit, when a first time of pressing operation on the key is detected;

recording current positions of the first motor, the second motor and the third motor as the initial positions by the motor control circuit when receiving the first saving instruction in the calibration mode;

generating a second saving instruction and sending the second saving instruction to the motor control circuit by the key control circuit, when a second time of pressing operation on the key is detected; and recording current positions of the first motor, the second motor and the third motor as the end position when the motor control circuit receives the second saving instruction in the calibration mode.

By implementing the stabilizer auto-rotating control method provided in the present disclosure, a target object (such as a mobile phone, a camera or the like) is driven to rotate freely in a three-dimensional space, and multi-angle shooting is achieved, so that the viewing angle of the image captured by the target object meet the needs of photographers, and time-lapse shooting of the target object is realized with regard to multiple directions in the three-dimensional space, just satisfying the photographer's individual requirements for viewing angle and multi-direction time-lapse shooting.

BRIEF DESCRIPTION OF THE DRAWINGS

In order to clearly explain the embodiments of the present invention or the technical solutions in the prior art, the drawings used in the description of the embodiments or the prior art will be briefly described below. Obviously, the drawings described below are only the examples of the present invention. For those skilled in the art, other drawings may also be obtained according to these drawings without any creative work.

FIG. 4 is a flowchart of a stabilizer auto-rotating control method according to an embodiment of the present disclosure.

DETAILED DESCRIPTION OF ILLUSTRATED EMBODIMENTS

Figure 1:
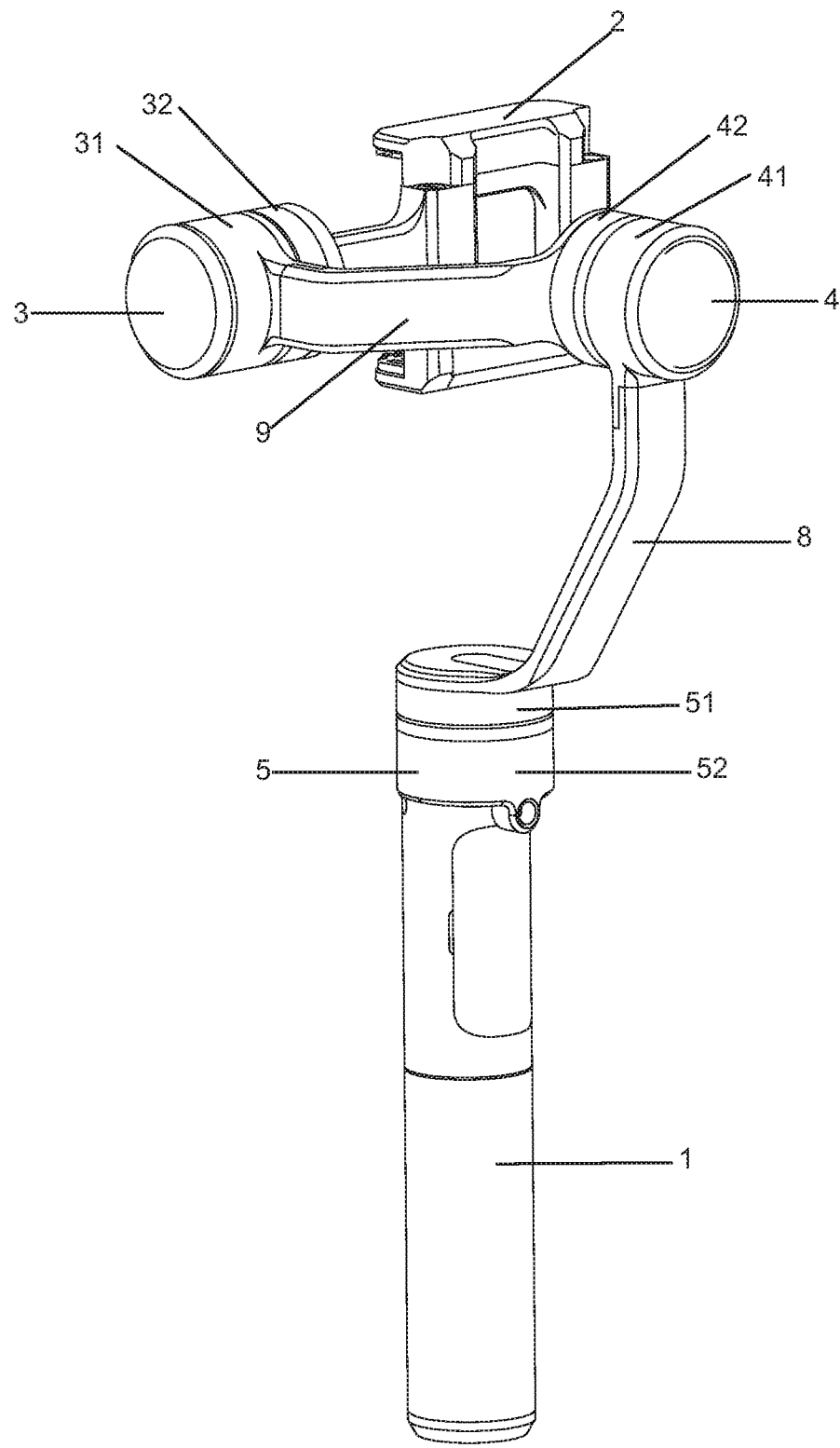
FIG. 1 is a schematic structural diagram of a stabilizer according to an embodiment of the present disclosure.
Figure 2:
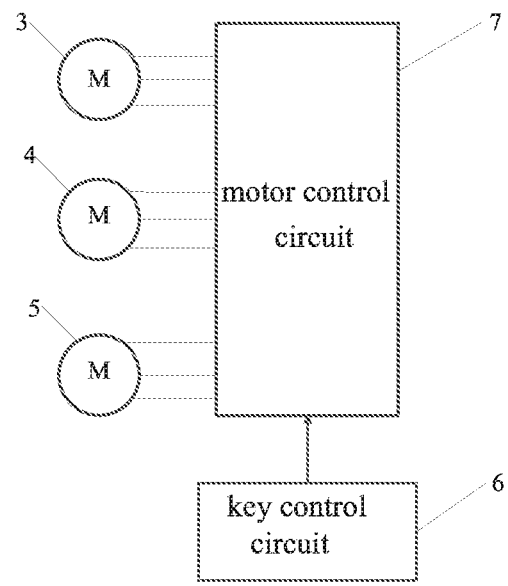
FIG. 2 is a schematic diagram of a stabilizer control structure according to an embodiment of the present disclosure.

FIG. 1 is a schematic structural diagram of a stabilizer according to an embodiment of the present invention; FIG. 2 is a schematic diagram of a stabilizer control structure according to an embodiment of the present invention. With reference to FIG. 1 and FIG. 2, the structure of a stabilizer provided by an embodiment of the present invention would be firstly introduced.

The stabilizer according to the present embodiment mainly comprises a hand-held component 1, a bracket 2 and three motors provided on top of the hand-held component and separated from each other by preset angles in space (the preset angles is in the range of 0 to 180 degrees). Specifically, the three motors are respectively a first motor 3, a second motor 4 and a third motor 5. Preferably, any two of axes of the first motor 3, the second motor 4 and the third motor 5 are mutually perpendicular. The stator 51 of the third motor 5 is connected to the hand-held component 1; the rotor 52 of the third motor 5 is connected to the stator 41 of the second motor 4; the rotor 42 of the second motor 4 is connected to the stator 31 of the first motor 3; the rotor 32 of the first motor 3 is connected to the bracket 2. Based on the above structure, the bracket 2 rotates with an axis of the first motor 3 when the first motor 3 is started; the first motor 3 and the bracket 2 as a whole rotates with an axis of the second motor 4 when the second motor 4 is started; the first motor 3, the second motor 4 and the bracket 2 as a whole rotates with an axis of the third motor 5 when the third motor 5 is started. Preferably, the axis of the third motor 5 is vertical and the axes of the first motor 3 and the axis of the second motor 4 are horizontal, and any two of axes of the first motor, the second motor and the third motor are separated by 90 degrees.

According to another embodiment, the stabilizer further comprises a communication component 11; the stabilizer communicates with an external device (for example, a cell phone, computer or the like) through the communication component 11. The stabilizer is able to communicate with an external device through wire means (for example, power line, headphone cable or the like.) or wireless means (for example, WIFI technique, Bluetooth or the like.), and the communication components 11 correspond to wire communication components or wireless communication components, respectively. By means of the communication component 11, the external device can transmit a photographing command, a motor rotation speed and the like to the stabilizer.

According to another embodiment, the stabilizer further comprises a key 61. Pressing operation implemented on the key 61 by users can control the stabilizer to rotate, control a target object to photograph, recording positions or the like.

With regard to practical applications, it should be noted that the stator can be considered as fixed part of the motor, the rotor can be considered as the rotating part of the motor, the first motor 3 is used to control pitching motion of the bracket 2, and the second motor 4 is used to control rolling motion of the bracket 2, and the third motor 5 is used to control the directional motion of the bracket 2. Therefore, by means that three motors that are orthogonally distributed in space, a target object (for example, a cell phone or a camera) fixed in the bracket 2 is driven to rotate randomly in three-dimensional space, which facilitates multi-angle shooting and keeps the viewing angles of the images captured by the mobile phone relatively stable.

Figure 3:
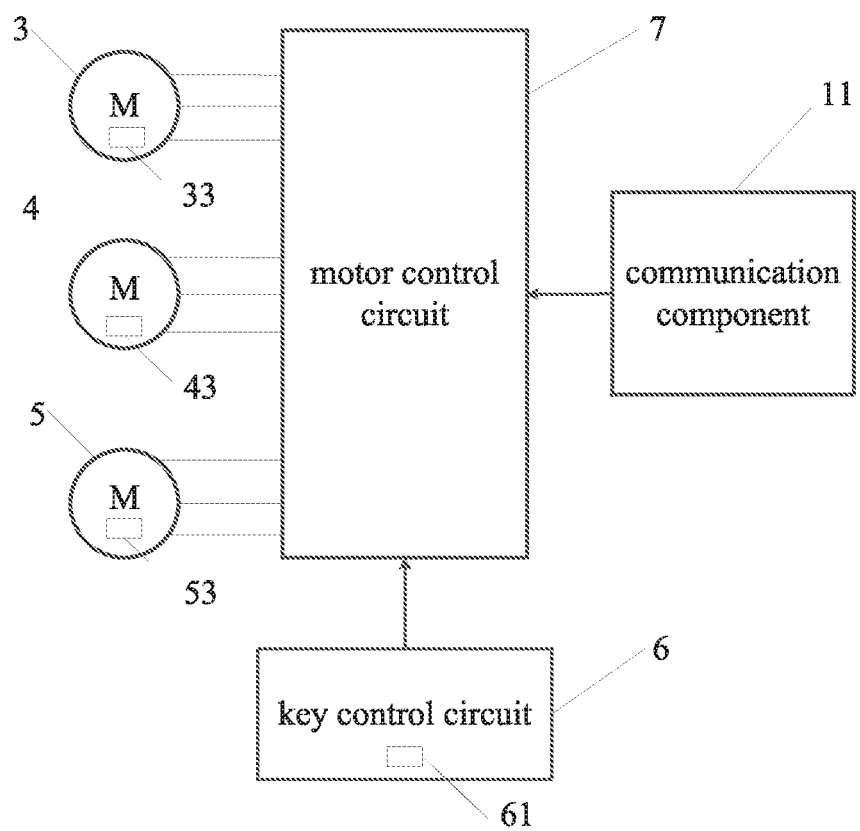
FIG. 3 is a schematic diagram of another stabilizer control structure according to an embodiment of the present disclosure.

With reference FIG. 2 and FIG. 3, the stabilizer further comprises a key control circuit 6 and a motor control circuit 7; a signal output end of the key control circuit 6 is connected with a signal input end of the motor control circuit 7, and a signal output end of the motor control circuit 7 is respectively connected with the first motor 3, the second motor 4 and the third motor 5; the key control circuit 6 comprises the key 61, and the key control circuit 6 generates a control command in response to a user's pressing operation on the key, the key control circuit 6 then sends the control command to the motor control circuit 7; motions of the first motor 3, the second motor 4 and the third motor 5 are controlled by the motor control circuit 7 according to the control command sent from the key control circuit 6. The communication component 11 is connected to the motor control circuit 7.

With regard to practical applications, it should be noted that, the first motor 3 and the second motor 4 are set with an angular limit, and the first motor 3 and the second motor 4 can arbitrarily rotate within the range of the angular limit, and the third motor 5 can rotate by any degrees within 360 degrees. The rotating shafts of the three motors are preferably hollow shafts, and slipping rings are arranged in the hollow shafts so that the control wires or wires passing through one of the three motors will not rotate with the motor.

Further, in order to provide a sufficient rotating space for the first motor 3, the rotor 52 of the third motor 5 and the stator 41 of the second motor 4 are fixedly connected by the first extending arm 8. In order to provide a sufficient rotating space for the first motor 3 and the bracket 2 as a whole, the rotor 42 of the second motor 4 and the stator 31 of the first motor 3 are fixedly connected by the second extending arm 9.

FIG. 4 is a flowchart of a stabilizer auto-rotating control method according to an embodiment of the present invention, and the method is applicable for any stabilizer mentioned above, and the method comprises:

a calibration step 101: recording initial positions and end positions of the first motor 3, the second motor 4, and the third motor 5 in response to a calibration instruction for the stabilizer; and a photographing step 102: controlling the first motor 3, the second motor 4, and the third motor 5 to rotate from the initial positions to the end positions at preset rotation speeds according to the initial positions and the end positions of the first motor 3, the second motor 4, and the third motor 5 in response to a photographing instruction.

In the calibration step 101, the calibration instruction is generated in the following way:

the calibration instruction is generated when n times of successive pressing operations on the key 61 are detected within a preset period of time; wherein n≥1.

No specific limitation is imposed on the preset period of time. At the same time, the number of times of the pressing operations is not specifically limited either. Any time period and any number of times of the pressing operations based on which the calibration instruction can be generated are within the scope of the present invention.

Preferably, after generating calibration instruction, the recording the initial positions and the end positions of the first motor 3, the second motor 4, and the third motor 5 in the calibration step is consisted of:

recording current positions of the first motor 3, the second motor 4, and the third motor 5 as the initial positions respectively when a first time of pressing operation on the key 61 is detected; recording current positions of the first motor 3, the second motor 4, and the third motor 5 as the end positions respectively when a second time of pressing operation on the key 61 is detected.

Figure 5:
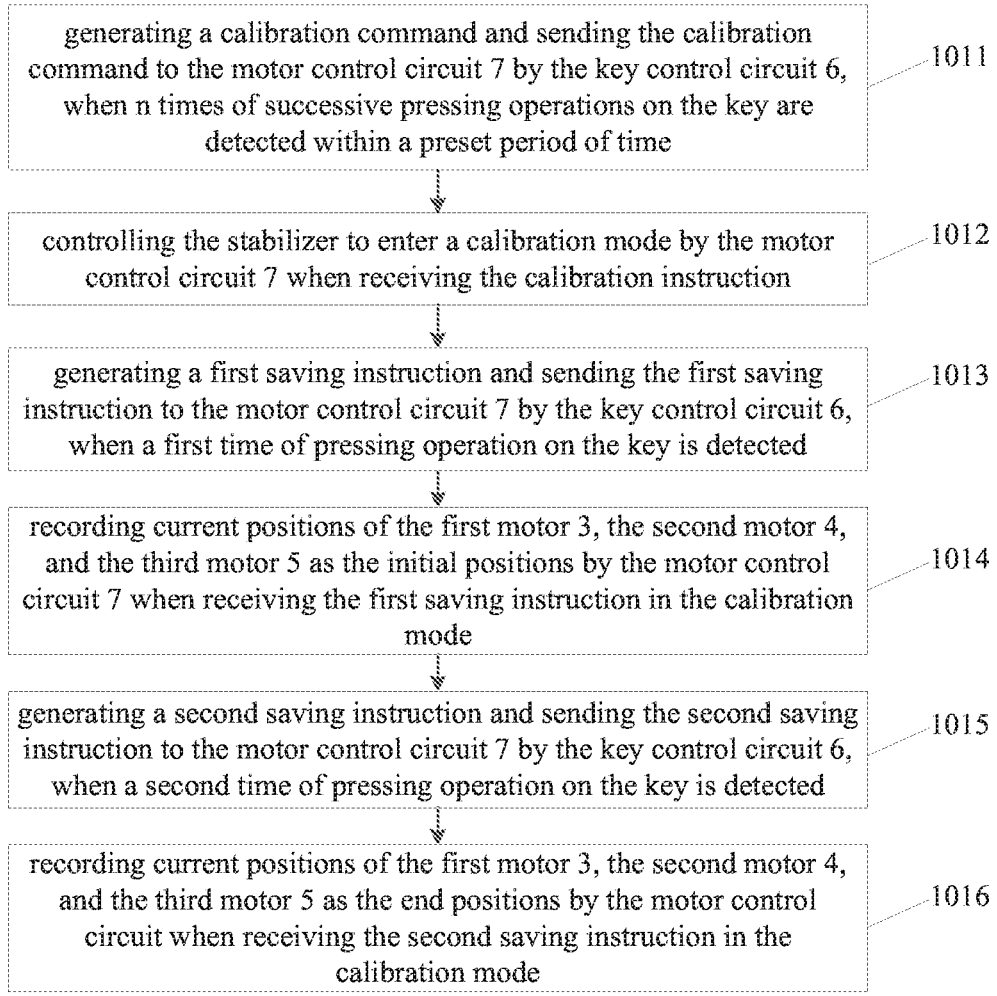
FIG. 5 is a flowchart of the calibration step according to an embodiment of the present disclosure.

With reference to FIG. 5, the calibration step comprises:

S1011, generating a calibration command and sending the calibration command to the motor control circuit 7 by the key control circuit 6, when n times of successive pressing operations on the key are detected within a preset period of time;

S1012, controlling the stabilizer to enter a calibration mode by the motor control circuit 7 when receiving the calibration instruction;

S1013, generating a first saving instruction and sending the first saving instruction to the motor control circuit 7 by the key control circuit 6, when a first time of pressing operation on the key is detected;

S1014, recording current positions of the first motor 3, the second motor 4, and the third motor 5 as the initial positions by the motor control circuit 7 when receiving the first saving instruction in the calibration mode;

S1015, generating a second saving instruction and sending the second saving instruction to the motor control circuit 7 by the key control circuit 6, when a second time of pressing operation on the key is detected; and S1016, recording current positions of the first motor 3, the second motor 4, and the third motor 5 as the end positions by the motor control circuit 7 when receiving the second saving instruction in the calibration mode.

To explain the above-described implementation process, the calibration process will be described in more detail below. When a user needs to perform time-lapse shooting, he/she firstly haves to place a target object (such as a mobile phone, a video camera, a camera) in the bracket 2 of the stabilizer, and then set angle of the target object and the initial position and the end position of the time-lapse shooting. Specifically, the user presses the key 61 on the stabilizer manually for n times (for example, 4 times) so that the stabilizer enters the calibration mode; then, the user manually adjusts the first motor 3, the second motor 4, and the third motor to a suitable position and then presses the key 61 on the stabilizer, so that the stabilizer automatically stores the current positions of the first motor 3, the second motor 4, and the third motor 5 as their respective initial positions; finally, the user manually adjusts the first motor 3, the second motor 4, and the third motor to another suitable position and then presses the key 61 on the stabilizer, so that the stabilizer automatically stores the current positions of the first motor 3, the second motor 4, and the third motor 5 as their respective end positions. It should be particularly noted that the initial positions and the ending positions of the first motor 3, the second motor or the third motor 5 may be the same in order to meet demand of actual scene.

Preferably, the first motor 3 is provided with a first magnetic encoder 33 for detecting and recording positions of the first motor 3, and the second motor 4 is provided with a second magnetic encoder 43 for detecting and recording positions of the second motor 4; the third motor 5 is provided with a third magnetic encoder 53 for detecting and recording positions of the third motor 5. Preferably, all of the first motor 3, the second motor 4, and the third motor 5 are three-phase brushless AC motors. In practical applications, since the three-phase asynchronous motor is a highly coupled, nonlinear, multi-variable system, it is very difficult to control. Therefore, in the photographing step, the stabilizer controls rotations of the first motor, the second motor, and the third motor of the third motor 5 through a vector control method.

The vector control method will be explained in detail below. Firstly, three-phase symmetrical AC vectors of the first motor 3, the second motor 4 and the third motor 5 are acquired in real time, and the three-phase symmetrical AC vectors are deposed into a current component (excitation current) that generates a magnetic field and a current component (torque current) that generates a torque. The excitation current and the torque current are respectively controlled by adjusting the amplitude and phase between the two components, thereby implementing feedback control on the current vector. Furthermore, decoupling process of the current vector needs to pass two transformations. Firstly, the three-phase symmetrical AC vectors that are stationary relative to the stator is transformed into two-phase AC vectors separated by 90 degrees that are stationary relative to the stator through Clark transforming, and then the two-phase AC vectors separated by 90 degrees is transformed into two dc components (i.e., excitation current and torque current) that is stationary relative to stator through the Park transforming. In turn, when the motor is controlled based on the excitation current and the torque current, the excitation current and the torque current are set firstly, and then shifted to the two phases that are stationary with respect to the stator, and then converted to the three phases that are stationary with respect to the stator. Through the vector control method, a three-phase motor can be controlled as well as a direct current motor so as to achieve the purpose of controlling the torque of the asynchronous motor.

Figure 6:
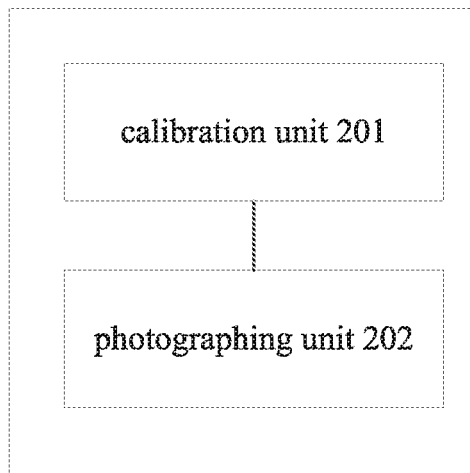
FIG. 6 is a flowchart of a stabilizer auto-rotating control method according to an embodiment of the present disclosure.

FIG. 6 is a schematic structural diagram of a stabilizer auto-rotating control apparatus according to an embodiment of the present invention, and the apparatus is arranged in any stabilizer mentioned above, and the apparatus 200 comprises: a calibration unit 201, configured to record initial positions and end positions of the first motor 3, the second motor 4, and the third motor 5 in response to a calibration instruction for the stabilizer; and a photographing unit 202, configured to control the first motor 3, the second motor 4, and the third motor 5 to rotate from the initial positions to the end positions at preset rotation speeds according to the initial positions and the end positions of the first motor, the second motor, and the third motor in response to a photographing instruction.

According to another embodiment, the stabilizer comprises a processor, a memory, and computer program stored in the memory and configured to be executed by the processor. Any one of the stabilizer auto-rotating methods mentioned above is performed when the processor executes the computer program.

According to another embodiment, the present disclosure also provides a computer-readable storage medium comprising stored computer program, wherein a device in which the computer-readable storage medium is arranged executes any one of the stabilizer auto-rotating control methods mentioned above described above when the computer program is running.

Taking advantage of the above stabilizer and stabilizer auto-rotating control method, the target object (such as a mobile phone, a camera, etc.) is driven to rotate freely in a three-dimensional space, and multi-angle shooting is achieved, so that the viewing angle of the image captured by the target object meet the needs of photographers, and time-lapse shooting of the target object is realized with regard to multiple directions in the three-dimensional space, just satisfying the photographer's individual requirements for viewing angle and multi-direction time-lapse shooting.

Those skilled in the art should understand that the embodiments of the present invention may provide product such as method, system or a computer program. Thus, the present invention may take the form of an entire hardware embodiment, an entire software embodiment, or an embodiment combining software and hardware. Furthermore, the present invention may take the form of a computer program product with one or more computer-usable storage mediums (including but not limited to disk memory, CD-ROM, optical memory, etc.) embodied with computer-usable program instructions.

The computer-usable program instructions may also be stored in a computer readable memory that can direct a computer or other programmable data processing device to operate in a specific manner, so that instructions stored in the computer readable memory generate product that includes command device. The command device implements the functions specified in one or more blocks of block diagrams and/or one or more processes of the flowchart.

The computer-usable program instructions may also be loaded into a computer or other programmable data processing device such that a series of operating steps are performed on a computer or other programmable device to generate computer-implemented processes. The instructions performed on a computer or other programmable device provide steps for implementing the functions specified in one or more blocks of block diagrams and/or one or more processes of the flowchart.

Although the preferred embodiments of the present invention have been described, those skilled in the art can make additional changes and modifications to these embodiments once they learn the basic inventive concept. Therefore, the appended claims are intended to be interpreted as including the preferred embodiments and all changes and modifications that fall within the scope of the present invention.

Obviously, it will be apparent to those skilled in the art that various modifications and variations can be made in the present invention without departing from the spirit and scope of the invention. Thus, if these modifications and variations of the present invention fall within the scope of the claims of the present invention and their equivalents, the present invention is also intended to include these modifications and variations.

What is claimed is:

1. A stabilizer auto-rotating control method, wherein the method is applicable for a stabilizer comprising:
    a hand-held component;
    a first motor, a second motor and a third motor provided on top of the hand-held component and separated from each other by preset angles in space;
    a bracket connected with the first motor and configured to fix a target object; and
    a key;
    a stator of the third motor being connected to the hand-held component; a rotor of the third motor being connected to a stator of the second motor; a rotor of the second motor being connected to a stator of the first motor; a rotor of the first motor being connected to the bracket;

the bracket rotating with an axis of the first motor when the first motor is started; the first motor and the bracket as a whole rotating with an axis of the second motor when the second motor is started; the first motor, the second motor and the bracket as a whole rotating with an axis of the third motor when the third motor is started;

wherein the method comprises:

a calibration step: recording initial positions and end positions of the first motor, the second motor, and the third motor in response to a calibration instruction for the stabilizer; and a photographing step: controlling the first motor, the second motor, and the third motor to rotate from the initial positions to the end positions at preset rotation speeds according to the initial positions and the end positions of the first motor, the second motor and the third motor in response to a photographing instruction;

wherein the calibration instruction is generated in the following way:

the calibration instruction is generated when n times of successive pressing operations on the key are detected within a preset period of time; wherein n≥1;

wherein recording the initial positions and the end positions of the first motor, the second motor, and the third motor in the calibration step is consisted of:

recording current positions of the first motor, the second motor, and the third motor as the initial positions respectively when a first time of pressing operation on the key is detected; and recording current positions of the first motor, the second motor, and the third motor as the end positions respectively when a second time of pressing operation on the key is detected.

2. The stabilizer auto-rotating control method according to claim 1, wherein the stabilizer further comprises a communication component; the stabilizer communicates with an external device through the communication component;

wherein the stabilizer auto-rotating control method further comprises:

receiving the preset rotation speeds of the first motor, the second motor and the third motor respectively from the external device by the communication device before receiving the photographing instruction.

3. The stabilizer auto-rotating control method according to claim 1, wherein all of the first motor, the second motor and the third motor are three-phase brushless AC motors.

4. The stabilizer auto-rotating control method according to claim 3, wherein the rotations of the first motor, the second motor and the third motor are controlled through a vector control method.

5. The stabilizer auto-rotating control method according to claim 4, wherein controlling the rotations of the first motor, the second motor and the third motor through the vector control method comprises:

acquiring three-phase symmetrical AC vectors of the first motor, the second motor and the third motor in real time;

converting the three-phase symmetrical AC vectors into two-phase AC vectors separated by 90 degrees through Clark transforming;

converting the two-phase AC vectors separated by 90 degrees into an excitation current and a torque current by Park transforming; and implementing a feedback control on the three-phase symmetrical AC vectors of the first motor, the second motor and the third motor by adjusting the excitation current and the torque current.

6. The stabilizer auto-rotating control method according to claim 5, wherein any two of axes of the first motor, the second motor and the third motor are separated by 90 degrees.

7. The stabilizer auto-rotating control method according to claim 6, wherein the rotor of the third motor and the stator of the second motor are fixedly connected by a first extending arm, and the rotor of the second motor and the stator of the first motor are fixedly connected by a second extending arm.

8. The stabilizer auto-rotating control method according to claim 7, wherein the first motor is provided with a first magnetic encoder for detecting and recording positions of the first motor, and the second motor is provided with a second magnetic encoder for detecting and recording positions of the second motor; the third motor is provided with a third magnetic encoder for detecting and recording positions of the third motor.

9. The stabilizer auto-rotating control method according to claim 6, wherein the stabilizer further comprises a key control circuit and a motor control circuit;

a signal output end of the key control circuit is connected with a signal input end of the motor control circuit, and a signal output end of the motor control circuit is connected with the first motor, the second motor and the third motor;

the key control circuit comprises a key; the key control circuit generates a control command in response to a user's pressing operation on the key, the key control circuit then sends the control command to the motor control circuit;

wherein the calibration step is consisted of:

generating a calibration command and sending the calibration command to the motor control circuit by the key control circuit, when n times of successive pressing operations on the key are detected within a preset period of time;

controlling the stabilizer to enter a calibration mode by the motor control circuit when receiving the calibration instruction;

generating a first saving instruction and sending the first saving instruction to the motor control circuit by the key control circuit, when a first time of pressing operation on the key is detected;

recording current positions of the first motor, the second motor and the third motor as the initial positions by the motor control circuit when receiving the first saving instruction in the calibration mode;

generating a second saving instruction and sending the second saving instruction to the motor control circuit by the key control circuit, when a second time of pressing operation on the key is detected; and recording current positions of the first motor, the second motor and the third motor as the end positions by the motor control circuit when receiving the second saving instruction in the calibration mode.

* * * * *